US009800993B2

(12) United States Patent
Lee et al.

(10) Patent No.: US 9,800,993 B2
(45) Date of Patent: *Oct. 24, 2017

(54) METHOD AND APPARATUS FOR SETTING PROFILE (71) Applicant: Samsung Electronics Co., Ltd., Gyeonggi-do (KR)

(72) Inventors: Duckey Lee, Seoul (KR); Jungje Son, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/998,103

(22) Filed: Dec. 23, 2015

(65) Prior Publication Data
US 2016/0134991 A1 May 12, 2016

Related U.S. Application Data (63) Continuation of application No. 14/292,256, filed on May 30, 2014, now Pat. No. 9,232,392.

(30) Foreign Application Priority Data

May 30, 2013 (KR) .................... 10-2013-0061851

(51) Int. Cl.
*H04M 1/66* (2006.01)
*H04W 4/00* (2009.01)
(Continued)

(52) U.S. Cl.
CPC .......... *H04W 4/001* (2013.01); *H04W 8/205* (2013.01); *H04W 8/245* (2013.01); *H04W 8/265* (2013.01);
(Continued)

(58) Field of Classification Search
CPC ..... H04L 67/306; H04L 63/102; H04L 51/04; H04L 67/10; H04L 67/303; H04W 8/18; H04W 28/18
(Continued)

(56) References Cited

U.S. PATENT DOCUMENTS

2014/0136933 A1* 5/2014 Berger .................. G06Q 10/10
715/202
2014/0235210 A1 8/2014 Park
(Continued)

FOREIGN PATENT DOCUMENTS

EP 2 461 613 6/2012
JP 2011-028522 2/2011
(Continued)

OTHER PUBLICATIONS

Wikipedia: "Create, Read, Update and Delete", XP055316816, May 23, 2013, 2 pages.
(Continued)

*Primary Examiner* — Ronald Eisner
(74) *Attorney, Agent, or Firm* — The Farrell Law Firm, P.C.

(57) ABSTRACT

A method and apparatus for setting profiles are provided. The profile setting method includes receiving, from a first terminal, a profile transfer request message that requests transfer of a first profile or portion thereof from a first secure element to a second secure element; configuring a second profile using the first profile or portion thereof; and sending, to a second terminal, the configured second profile.

10 Claims, 9 Drawing Sheets (51) Int. Cl.
*H04W 12/04* (2009.01)
*H04W 8/20* (2009.01)
*H04W 8/24* (2009.01)
*H04W 8/26* (2009.01)
*H04W 8/18* (2009.01)
*H04W 12/02* (2009.01)
*H04W 12/10* (2009.01)

(52) U.S. Cl.
CPC .............. *H04W 12/04* (2013.01); *H04W 8/18* (2013.01); *H04W 8/183* (2013.01); *H04W 12/02* (2013.01); *H04W 12/10* (2013.01)

(58) Field of Classification Search
USPC .... 705/39, 44, 41, 35, 42, 16, 40, 43, 2, 30, 705/316, 14.23, 14.27, 14.46, 14.58, 19, 705/21, 26.41, 26.62, 26.8, 28, 3, 319, 705/344, 38, 6, 71, 72; 726/1, 26, 28, 4, 726/5, 6, 7, 8; 455/411, 466; 713/171, 713/185; 715/205, 844; 717/104
See application file for complete search history.

(56) References Cited

U.S. PATENT DOCUMENTS

2014/0308991 A1 10/2014 Lee et al.
2014/0329502 A1 11/2014 Lee

FOREIGN PATENT DOCUMENTS

| WO | WO 2009/103623 | 8/2009 |
| WO | WO 2013/036009 | 3/2013 |
| WO | WO 2013/036010 | 3/2013 |
| WO | WO 2013/066077 | 5/2013 |

OTHER PUBLICATIONS

GSM Association, Embedded SIM Task Force Requirements and Use Cases 1.0, GSMA, Feb. 21, 2011, 38 pages.
European Search Report dated Nov. 14, 2016 issued in counterpart application No. 14803675.9-1870, 10 pages.

* cited by examiner

METHOD AND APPARATUS FOR SETTING PROFILE

PRIORITY

This application is a continuation of U.S. application Ser. No. 14/292,256, which was filed in the U.S. Patent and Trademark Office on May 30, 2014, claims priority under 35 U.S.C. §119(a) to a Korean Patent Application filed on May 30, 2013 in the Korean Intellectual Property Office and assigned Serial No. 10-2013-0061851, the entire content of which is incorporated herein by reference.

BACKGROUND

1. Field of Invention

The present invention generally relates to a method and apparatus for setting profiles stored in a mobile terminal.

2. Description of the Related Art

A Universal Integrated Circuit Card (UICC) is a smart card inserted and used in a mobile terminal. The UICC stores personal information of a mobile communication subscriber, such as authentication information for network access, phonebook data, and text messages. When the mobile terminal connects to a mobile communication network such as a Global System for Mobile Communications (GSM), Wideband Code Division Multiple Access (WCDMA) or Long Term Evolution (LTE) network, the UICC performs subscriber authentication and traffic security key generation to thereby enable secure mobile communication. The UICC may store communication applications including a Subscriber Identity Module (SIM), Universal Subscriber Identity Module (USIM), and IP Multimedia Services Identity Module (ISIM) according to the type of mobile communication network to which the subscriber connects. In addition, the UICC provides a high level security function to install a variety of applications such as electronic wallets, tickets and passports.

A typical UICC is manufactured as a proprietary smart card of a specific mobile network operator according to requests of the mobile network operator. At the time of shipment, such a UICC is pre-embedded with authentication information for access to the corresponding mobile operator network (e.g. USIM application, International Mobile Subscriber Identity (IMSI), and key value (K)). Hence, the mobile network operator receives a manufactured UICC and provides the received UICC to a subscriber, and later, if necessary, performs management of the UICC by installing, modifying and removing an application through Over-The-Air (OTA) programming or the like. After inserting the UICC into a mobile terminal, the subscriber may manipulate the mobile terminal to use network and application services of the corresponding mobile network operator. To change terminals, the subscriber removes the UICC from the existing terminal and inserts it into a new terminal. Hence, the authentication information, the mobile phone number and the phonebook data stored in the UICC may be used in the new terminal.

The European Telecommunications Standards Institute (ETSI) has defined physical configurations and logical functions of UICCs to maintain worldwide compatibility. The form factor specifying physical configurations has continuously decreased: mini-SIMs (most widely used) were followed by micro-SIMs (introduced several years ago), and nano-SIMs (introduced in recent years). The development of smaller SIM cards has contributed to the development of smaller terminals. However, it is expected that it will be difficult to standardize UICC cards smaller than recently specified nano-SIMs because of the high likelihood of losing a card. It is also expected that it will be difficult to further miniaturize removable UICC cards, because space for card slots is needed in terminals.

Removable UICC cards may be unsuitable for machine-to-machine (M2M) devices, such as smart home appliances, electricity meters, water meters and Closed Circuit Television (CCTV) cameras, which require access to mobile data networks in various deployment environments without direct human intervention.

To address the above-mentioned problems, it is proposed to embed a secure element that has UICC or similar functions in a mobile terminal at the time of manufacture, in place of a removable UICC. However, such an embedded secure element would be irremovable after being installed in a mobile terminal. Hence, the mobile terminal may be unable to pre-store authentication information for access to a mobile operator network (such as USIM application, IMSI and key value) at the time of manufacture unless the mobile terminal is manufactured as a proprietary terminal of a particular mobile network operator. It would only be possible to configure such authentication information in a mobile terminal after a user who has purchased a mobile terminal subscribes to a mobile network operator.

In addition, unlike an existing UICC card that is manufactured and distributed as a proprietary card of a particular mobile network operator, a new embedded secure element would enable authentication information of various mobile network operators to be installed and managed in a secure and flexible manner when a user who has purchased a corresponding mobile terminal subscribes to a mobile network operator, unsubscribes from a mobile network operator, or changes mobile network operators. According to various usage scenarios such as a purchase of a new terminal, the new embedded secure element would also enable configured authentication information and stored user data to be securely transferred to a new mobile terminal.

SUMMARY

The present invention has been made to address the above problems and disadvantages and to provide at least the advantages described below. Accordingly, an aspect of the present invention is to provide an effective method for setting a profile.

In accordance with an aspect of the present invention, a method for setting profiles for a profile server is provided. The method includes receiving, from a first terminal, a profile transfer request message that requests transfer of a first profile or portion thereof from a first secure element to a second secure element; configuring a second profile using the first profile or portion thereof; and sending, to a second terminal, the configured second profile.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF EMBODIMENTS OF THE PRESENT INVENTION

Hereinafter, embodiments of the present invention are described in detail with reference to the accompanying drawings.

Descriptions of functions and constructions that are well-known in the relevant art and are not directly related with the present invention are omitted to avoid obscuring the subject matter of the present invention.

In the drawings, some elements are exaggerated, omitted or only outlined in brief, and thus may not be drawn to scale. The same reference numbers are used throughout the drawings to refer to the same or like elements.

Figure 1:
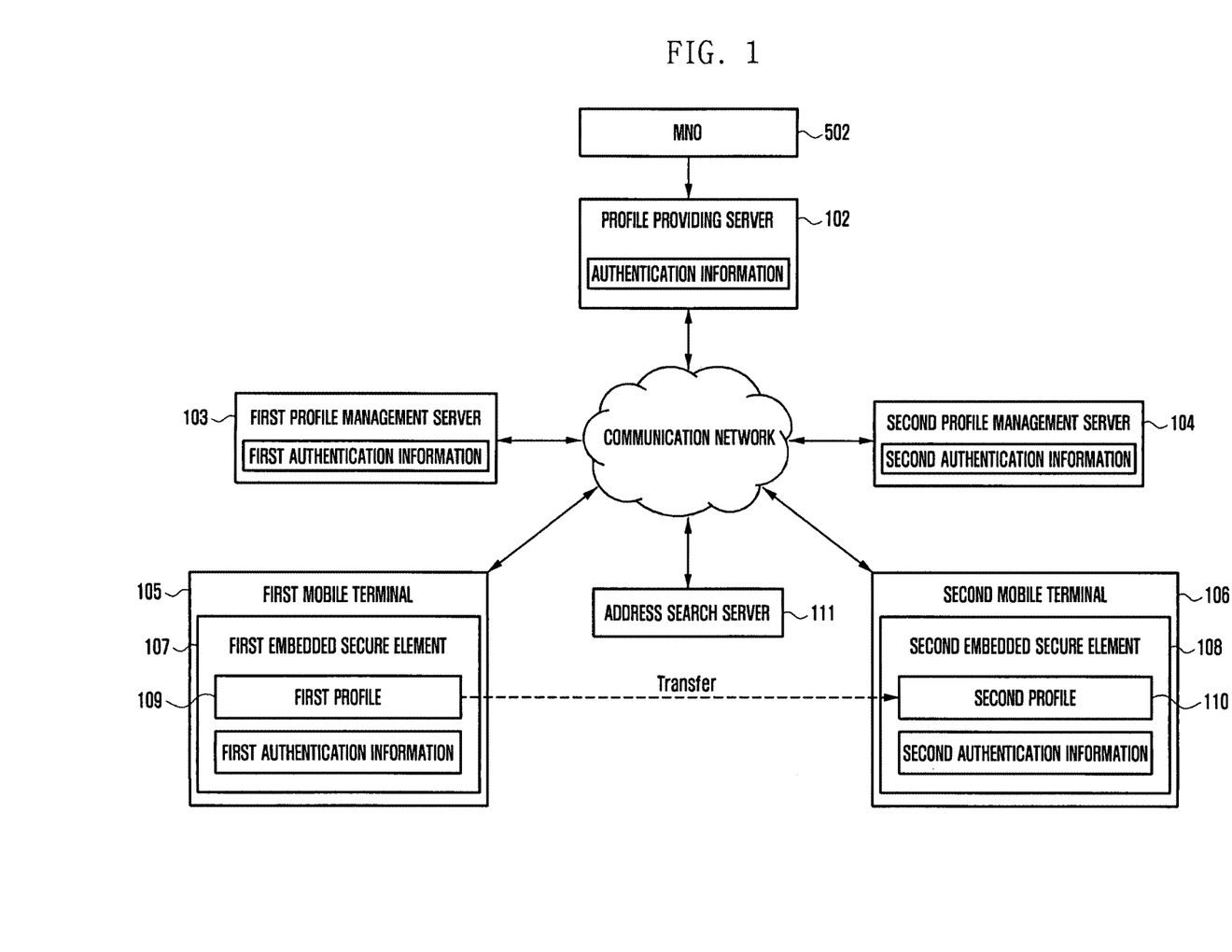
FIG. 1 illustrates an architecture of a communication system according to an embodiment of the present invention.

FIG. 1 illustrates an architecture of a communication system according to an embodiment of the present invention.

Referring to FIG. 1, the communication system includes first and second mobile terminals 105 and 106, first and second embedded Secure Elements (eSEs) 107 and 108, respectively installed in the first and second mobile terminals 105 and 106, a profile provider 102, first and second profile managers 103 and 104, and an address search server 111. In an embodiment of the present invention, the address search server 111 may be omitted.

The first and second embedded secure elements 107 and 108 may include an embedded secure element that may be attached to a substrate of the first or second mobile terminals 105 and 106 or installed therein. The embedded UICC (eUICC) is a type of secure element embedded in a terminal. First and second profiles 109 and 110 are installed as software items in the first and second embedded secure elements 107 and 108, respectively. The first and second profiles 109 and 110 are software packages containing information corresponding to one or more existing removable UICCs. For example, the first and second profiles 109 and 110 may be defined as software packages that contain user data, such as one or more applications, subscriber authentication information and phonebook data, embedded in a UICC.

The profile provider 102 may be directly operated by a Mobile Network Operator (MNO) or may be operated by an agent fully trusted by the MNO. The profile provider 102 generates a profile for a subscriber subscribing to the corresponding mobile network operator, encrypts the profile, and sends the encrypted profile to the first and second profile managers 103 and 104. The profile provider 102 may be implemented as, for example, a profile providing server as in FIG. 1.

The first and second profile managers 103 and 104 manage profiles for the first and second embedded secure elements 107 and 108, respectively. Due to characteristics of secure elements based on smart card technology, the same security key information is configured in both the first and second embedded secure elements 107 and 108 and the first and second profile managers 103 and 104 before the first and second mobile terminals 105 and 106 are sold to a user (typically, at the time of terminal manufacture). Hence, the first and second profile managers 103 and 104 may be operated by the manufacturer of the first and second embedded secure elements 107 and 108 or the first and second mobile terminals 105 and 106. The first and second profile managers 103 and 104 may be implemented as, for example, a profile management server as in FIG. 1.

The first and second profile managers 103 and 104 each receive an encrypted profile from the profile provider 102 and securely send the same to the corresponding first and second embedded secure elements 107 and 108, which decrypt and install the profiles. Thereafter, the first and second profile managers 103 and 104 each perform profile management including profile activation, deactivation, backup or deletion. According to the terminal state of a subscription to mobile network operators, the first and second embedded secure elements 107 and 108 may store multiple profiles. In this case, if the first and second mobile terminals 105 and 106 connect to a mobile communication network, one of the profiles stored in the first and second embedded secure elements 107 and 108 is selected and used.

Figure 2:
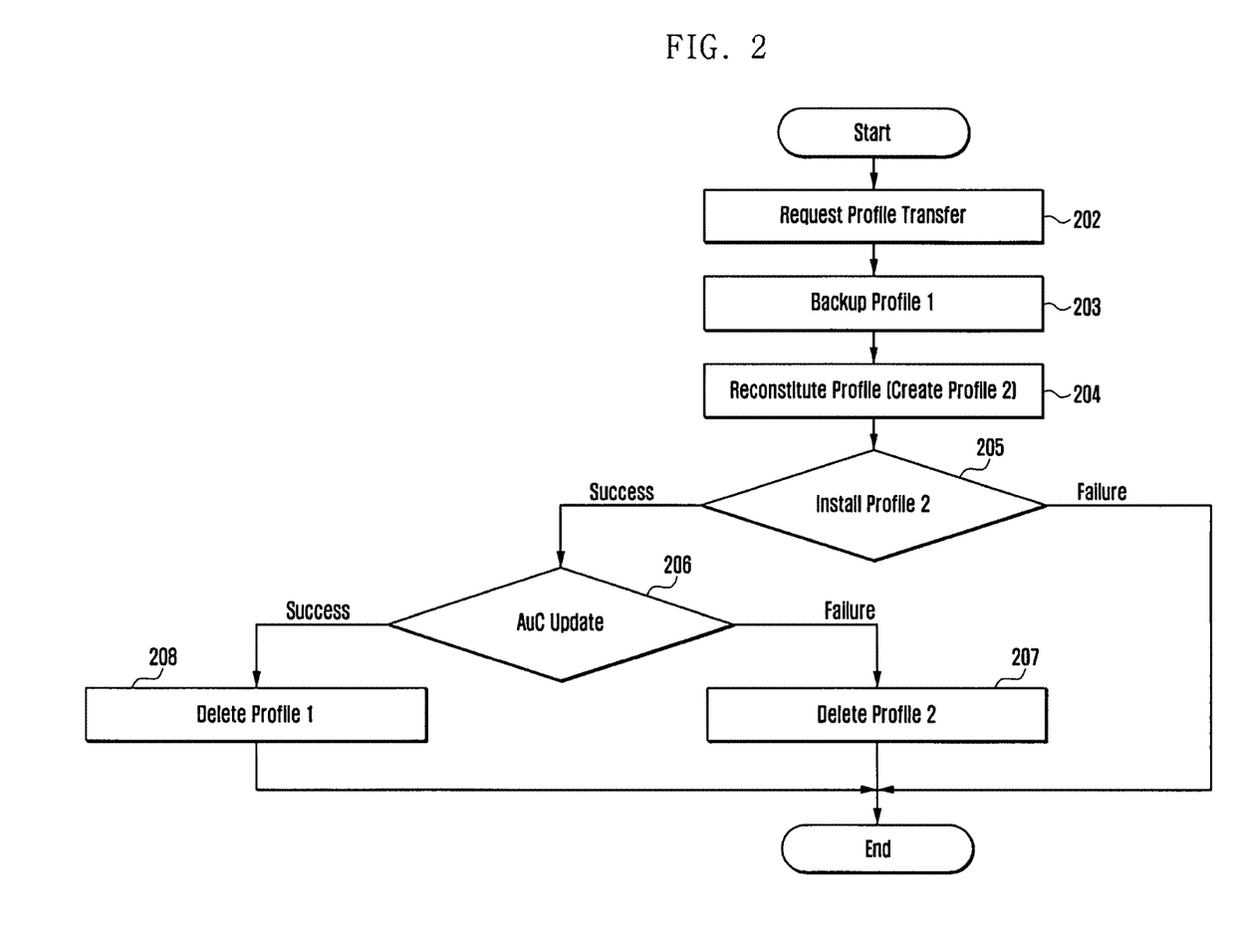
FIG. 2 is a flowchart of a profile setting procedure according to an embodiment of the present invention.

FIG. 2 is a flowchart of a profile setting procedure according to an embodiment of the present invention.

FIG. 2 describes a procedure in which, in response to a request for a profile transfer from the first embedded secure element 107 to the second embedded secure element 108, profile information of the first embedded secure element 107 is backed up and reconfigured so as to be installable in the second embedded secure element 108, the reconfigured profile is installed in the second embedded secure element 108, and processing continues according to the results of installation and Authentication Center (AuC) update.

Referring to FIG. 2, at step 202, the profile provider 102 or first profile manager 103 receives a profile transfer request from a user or user terminal. The profile transfer request message may include an identifier of the first mobile terminal 105 or first embedded secure element 107 and an identifier of the second mobile terminal 106 or second embedded secure element 108. When multiple profiles are stored in the first embedded secure element 107, the profile transfer request message may further include, an indication of the desired profile, at least one of a profile identifier, Mobile Subscriber Integrated Services Digital Network-Number (MSISDN, phone number), and IMSI. Then, the profile manager 103 sends a profile backup request message to the first mobile terminal 105.

At step 203, the first profile 109 stored in the first embedded secure element 107 is backed up, encrypted, and sent to the profile providing server 102. Here, the first embedded secure element 107 of the first mobile terminal 105 encrypts the first profile 109 using a public key in a certificate of the profile provider server 102. Alternatively, the first embedded secure element 107 of the first mobile terminal 105 generates a symmetric key for encryption and decryption and encrypts the first profile 109 using the symmetric key, and encrypts the symmetric key using the public key in the certificate of the profile provider server 102 and sends the encrypted symmetric key to the profile provider server 102.

In an embodiment of the present invention, the first mobile terminal 105 encrypts the entire contents of the first profile 109 for transfer. In another embodiment of the present invention, the first mobile terminal 105 encrypts only user data of the first profile 109 (such as phonebook data) excluding security-sensitive data (such as the USIM authentication key K) and sends the encrypted data. In this case, the profile provider 102 may add data corresponding to the unsent contents at step 204 (described below). In another embodiment of the present invention, if necessary, the user selects a portion of applications and data constituting the first profile 109 to be transferred to the second embedded secure element 108.

Figure 3:
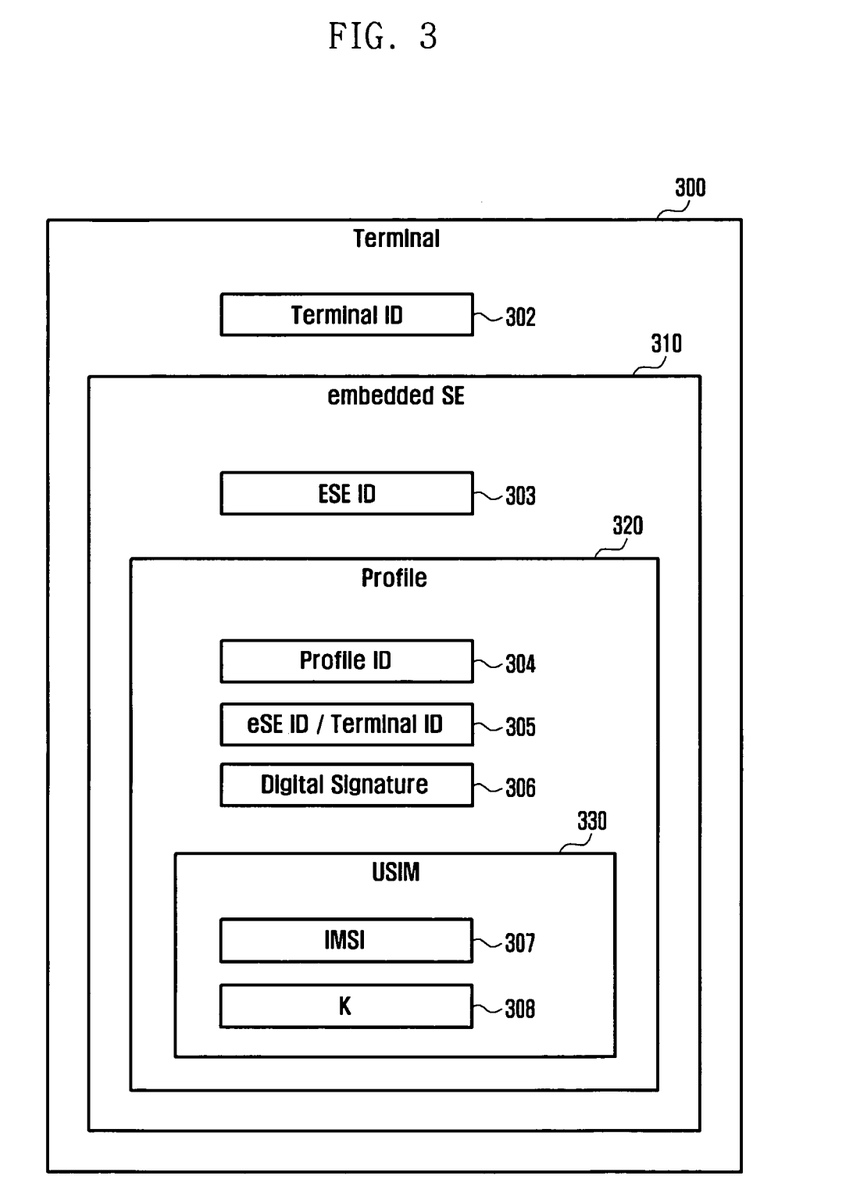
FIG. 3 illustrates a data structure in a mobile terminal according to an embodiment of the present invention.

FIG. 3 illustrates a structure of data in a mobile terminal according to an embodiment of the present invention.

Referring to FIG. 3, the mobile terminal 300 has a terminal ID 302. The eSE 310 embedded in the mobile terminal 300 has an eSE ID 303. The eSE 310 stores a profile 320.

The profile 320 has a profile ID 304. The profile 320 includes a USIM 330. The USIM 330 includes an IMSI 307 and K 308. The profile 320 further includes supplementary values 305 and 306, which are used to deactivate the profile 320 when the profile 320 is illegitimately copied or cloned to another eSE. The profile 320 may further include an eSE ID 305 indicating the identifier of the eSE in which the profile 320 is to be installed. Here, terminal ID may be used instead of eSE ID, eSE ID and terminal ID may be used together, or a combination of eSE ID and terminal ID may be used. Later, for ease of description, it is assumed that only eSE ID is used in the field 305.

The profile 320 may further include a digital signature 306. The digital signature 306 may be used to detect illegitimate modification of the eSE ID 305 or USIM 330 by a third party attempting to clone the eSE 310. The profile provider may generate the digital signature 306 by applying a digital signing procedure to the profile ID 304, eSE ID and/or terminal ID 305, and IMSI 307 and/or K 308 of the USIM 330.

In one embodiment of the present invention, the digital signature 306 may be generated using the following Equation 1.

Digital Signature=RSAwithSHA1(Profile ID|eSE ID|IMSI)  Equation 1

When the digital signature 306 is generated using the profile ID 304, eSE ID 305 and IMSI 307, illegitimate copying of both the profile 320 and the USIM 330 through examination of the digital signature 306 is prevented.

In another embodiment of the present invention, the digital signature 306 is generated using only the profile ID 304 and eSE ID 305. That is, the digital signature 306 is generated using the following Equation 2.

Digital Signature=RSAwithSHA1(Profile ID|eSE ID)  Equation 2

In this embodiment of the present invention, illegitimate copying of the profile 320 is prevented while illegitimate copying of the USIM 330 is not prevented.

In another embodiment of the present invention, the digital signature 306 may be generated using only the profile ID 304 and IMSI 307. That is, the digital signature 306 may be generated using the following Equation 3.

Digital Signature=RSAwithSHA1(Profile ID|IMSI)  Equation 3

In this embodiment of the present invention, illegitimate copying of the profile 320 is not prevented, while illegitimate copying of the USIM 330 is prevented.

Figure 4:
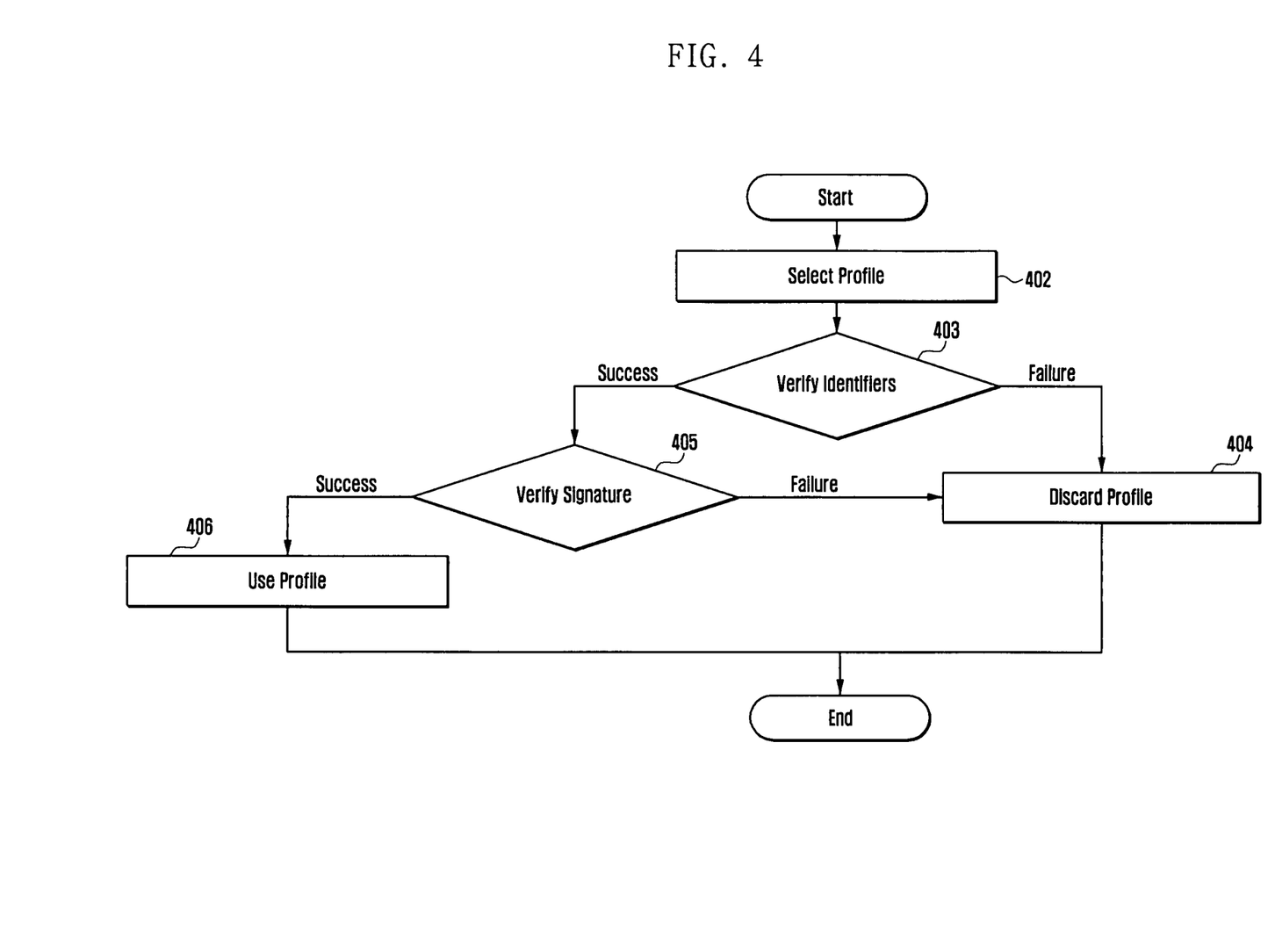
FIG. 4 is a flowchart of a profile activation procedure according to an embodiment of the present invention.

FIG. 4 is a flowchart of a profile activation procedure according to an embodiment of the present invention. The mobile terminal 300 activates the profile according to the procedure of FIG. 4, and detects illegitimate copying of the profile and/or the USIM.

Referring to FIG. 4, at step 402, the embedded secure element (eSE) 310 selects a profile. In an embodiment of the present invention, the eSE 310 selects a profile according to a user selection through the touchscreen or keypad. In another embodiment of the present invention, when the mobile terminal 300 boots or transitions from flight mode to communication mode, the eSE 310 automatically selects a profile. The eSE 310 selects at least one stored profile in a suitable manner.

At step 403, the eSE 310 verifies the eSE ID in the selected profile. As described above, the terminal ID may be used instead of the eSE ID, or a combination of the eSE ID and terminal ID may be used.

If the eSE ID is not correct, the eSE 310 proceeds to step 404 at which the eSE 310 does not use the selected profile. Here, the eSE 310 discards the selected profile. Then, the eSE 310 selects another profile and repeats the above procedure. Here, a profile having an incorrect identifier is not used. If the eSE ID is correct, the eSE 310 proceeds to step 405.

At step 405, the eSE 310 verifies the digital signature in the selected profile. If the digital signature is correct, the eSE 310 proceeds to step 406 at which the eSE 310 uses the selected profile. If the digital signature is not correct, the eSE 310 proceeds to step 404 at which the eSE 310 does not use the selected profile and discards it.

Referring to FIG. 2, at step 204, the profile provider 102 reconfigures the second profile 110 using data in the received first profile 109.

For profile reconfiguration with reference to a scheme for illegitimate copy prevention described in FIGS. 3 and 4, the profile provider 102 replaces the identifier of the first embedded secure element 107 in the first profile 109 with the identifier of the second embedded secure element 108 and regenerates the signature correspondingly.

In addition, if the reconfigured second profile 110 is successfully installed in the second embedded secure element 108, the existing first profile 109 installed in the first embedded secure element 107 is removed or invalidated. If the first profile 109 is not removed due to a technical error or malicious intent, to prevent illegitimate use of the first profile 109, the profile provider 102 generates the second profile using the USIM authentication key K of the second profile 110 to be installed in the second embedded secure element 108 at step 204. The K of the second profile 110 may differ from that of the first profile 109. Alternatively, the profile provider 102 sends the AuC of the corresponding mobile network operator a request for updating the K of the first profile 109 with that of the second profile 110. Then, the AuC updates the K in accordance with the profile. While the first profile 109 is not removed from the first embedded secure element 107, as the K of the AuC is changed, the first mobile terminal 105 is unable to connect to a 3GPP network using the USIM of the first profile 109. In other words, when a connection approval request is received from the first mobile terminal 105 using the first profile 109, the AuC performs authentication using the K stored in the AuC. In this embodiment of the present invention, as the K stored in the AuC is updated with the K corresponding to the second profile 110, the connection approval request made by the first mobile terminal 105 using the old K is rejected.

At step 205, the reconfigured second profile 110 is installed in the second embedded secure element 108. The installation result is sent to the profile provider 102 and the first and second profile managers 103 and 104.

If installation of the second profile 110 is unsuccessful, the procedure ends. Hence, the first profile 109 installed in the first mobile terminal 105 remains in the same state as before the profile transfer request was made.

If installation of the second profile 110 is successful, the profile provider 102 proceeds to step 206 at which the profile provider 102 sends an update K request to the AuC. The AuC updates the K and sends the update result to the profile provider 102.

If update of the K is successful, the profile provider 102 proceeds to step 208 at which the profile provider 102 sends a request message for deleting the first profile 109 to the first mobile terminal 105. Then, the first mobile terminal 105 deletes the first profile 109. As described above, although the first profile 109 is not removed at step 208 due to a technical error or malicious intent, as the AuC has updated the K at operation 206, the first mobile terminal 105 using the first profile 109 is not allowed to access the network.

If update of the K is unsuccessful at step 206, the profile provider 102 proceeds to step 207 at which the profile provider 102 sends a request message to delete the second profile 110 to the second mobile terminal 106. Then, the second mobile terminal 106 deletes the second profile 110 and returns to the state before the profile transfer request was made. Here, although the second profile 110 is not removed due to a technical error or malicious intent, as the AuC has failed to update the K at step 206, the second mobile terminal 106 using the second profile 110 is not allowed to access the communication network.

Through the procedure described above, the profile is transferred from the first mobile terminal 105 to the second mobile terminal 106 in a secure manner. If a failure occurs at any step of the procedure, the initial state is recovered as in the case of transaction processing.

Figure 5:
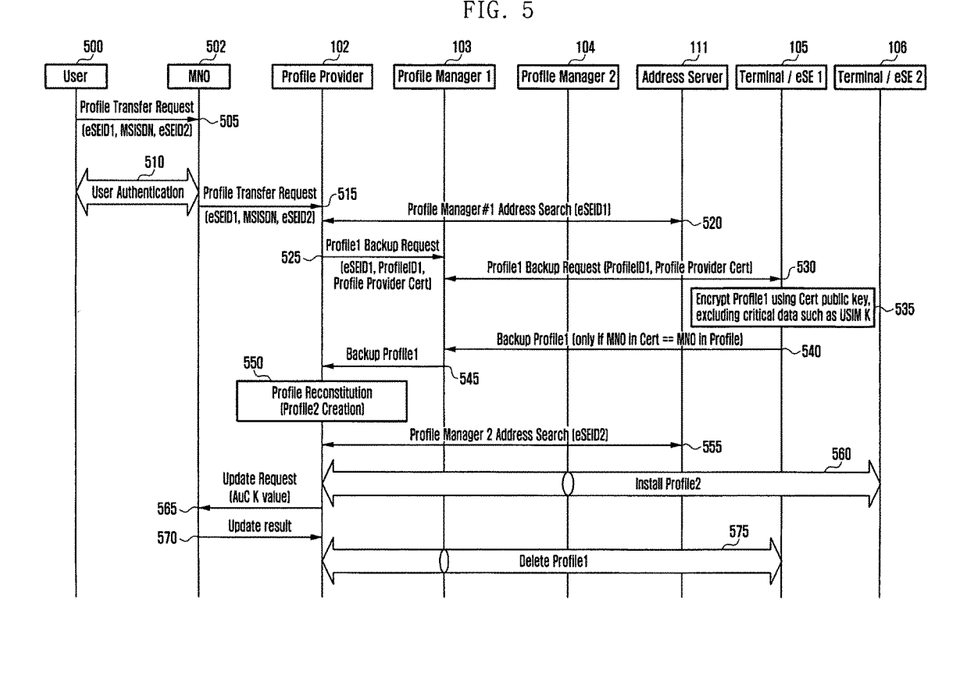
FIG. 5 is a sequence diagram illustrating a profile setting procedure according to a first embodiment of the present invention.

FIG. 5 is a sequence diagram illustrating a profile setting procedure according to an embodiment of the present invention.

The embodiment described in FIG. 5 may be realized on the system disclosed in FIG. 1.

Referring to FIG. 5, at step 505, the MNO 502 receives a profile transfer request message from a user 500. With regard to FIG. 2, the profile transfer request message includes an identifier of the first mobile terminal 105 or first embedded secure element 107 and an identifier of the second mobile terminal 106 or second embedded secure element 108. If multiple profiles are stored in the first embedded secure element 107, the profile transfer request message further includes, to indicate a desired profile, at least one of a profile identifier, MSISDN and IMSI.

In step 510, user authentication is performed between the MNO 502 and the user 500. A request from an unauthorized user is rejected. If user authentication is successfully, the procedure continues to the next step.

In step 515, the MNO 502 forwards the received profile transfer request message to the profile provider 102.

In step 520, to find the address of a profile manager related to the first embedded secure element 107 of the first mobile terminal 105 at which the profile to be transferred is stored, the profile provider 102 sends a query to the address search server 111 and receives a corresponding response therefrom. Instead of the address search server 111, another type of address search interface or address storage device may beused. The address search server 111 is implemented as a distributed server such as a Domain Name Service (DNS) server. Alternatively, the profile provider 102 may directly store and manage addresses corresponding to individual embedded secure elements. In this embodiment of the present invention, the profile provider 102 finds the address of the first profile manager 103 without external communication, where the address may be in the form of an IP address and/or a domain address.

In step 525, the profile provider 102 sends a profile backup request message to the first profile manager 103, using the found address, where the profile backup request message includes an identifier of the first profile 109 to be transferred, an identifier of the first embedded secure element 107 (or the first mobile terminal 105), and a certificate of the profile provider 102. The certificate of the profile provider 102 includes an identifier of the MNO 502 as a field, and signing is performed based thereon.

In step 530, the first profile manager 103 forwards the profile backup request message to the first mobile terminal 105. The first profile manager 103 extracts the identifier of the first mobile terminal 105 or first embedded secure element 107 from the received profile backup request message, and identifies the destination to which the profile backup request message is to be forwarded. In particular, if an MSISDN is delivered through step 515, an SMS message may be sent as a profile backup request message to the desired terminal, where the profile backup request message includes an identifier of the first profile 109 and a certificate of the profile provider 102.

Upon reception of the profile backup request message, at step 535, the first mobile terminal 105 encrypts the profile. The first embedded secure element 107 of the first mobile terminal 105 identifies the identifier of the target profile 109 from the received profile backup request message. The first embedded secure element 107 encrypts at least a portion of the target profile 109. Profile encryption is described in detail with reference to FIG. 2.

In FIG. 5, in step 540, the first mobile terminal 105 sends the encrypted profile to the first profile manager 103. Only when the MNO ID contained in the certificate of the profile provider is identical to the MNO ID contained in the profile 109 and the certificate is determined to be valid, are steps 535 (encryption) and 540 (transfer) performed.

In step 545, the first profile manager 103 forwards the backed-up profile to the profile provider 102.

In step 550, the profile provider 102 configures a second profile 110 on the basis of the received profile and a new K. A description of how to configure the second profile 110 is provided with reference to FIGS. 2 to 4.

In FIG. 5, in step 555, the profile provider 102 finds the address of the profile manager 105 related to the second embedded secure element 108 that will receive the second profile 110 through communication with the address search server 111. Address search is similar to that in step 520. As described above, when the profile provider 102 directly maintains address information', it finds a desired address without external communication.

In step 560, the profile provider 102 installs the second profile 110 in the second embedded secure element 108 of the second mobile terminal 106 via the second profile manager 104. The second profile 110 may be encrypted as in the case of the first profile 109. If installation is successful, the procedure continues to the next step.

In step 565, the profile provider 102 sends the AuC of the MNO 502 a request message for updating the K of the corresponding profile.

In step 570, the AuC notifies the profile provider 102 of the update result.

If update of the K is successful, in step 575, the profile provider 102 sends a request message for deleting the first profile 109 to the first mobile terminal 105. If update of the K is unsuccessful, the second profile 110 will be deleted.

Figure 6:
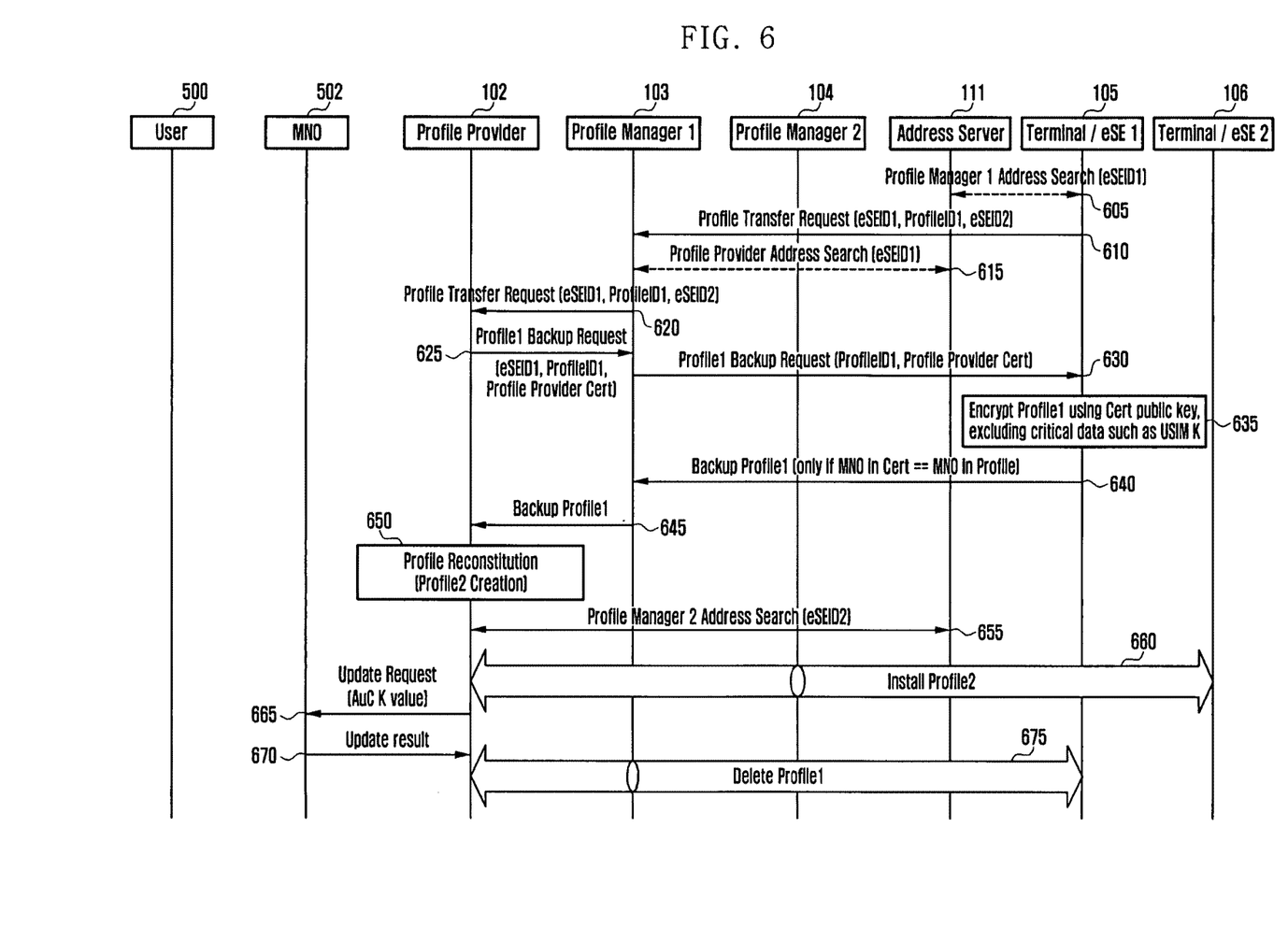
FIG. 6 is a sequence diagram illustrating a profile setting procedure according to a second embodiment of the present invention.

FIG. 6 is a sequence diagram illustrating a profile setting procedure according to an embodiment of the present invention.

The embodiment of the invention disclosed in FIG. 6 is similar to that of FIG. 5, but differs in that profile transfer is triggered by the first mobile terminal 105.

Referring to FIG. 6, according to a user input or the like, the first mobile terminal 105 attempts to transfer the first profile 109 to the second embedded secure element 108 of the second mobile terminal 106. In step 605, the first mobile terminal 105 finds the address of a profile manager related to the first embedded secure element 107 through communication with the address search server 111. As described above, when the first mobile terminal 105 directly maintains such addresses, step 605 is skipped.

In step 610, the first mobile terminal 105, using the found address, sends a profile transfer request message to the first profile manager 103. The profile transfer request message includes an identifier of the first embedded secure element 107, an identifier of a profile to be transferred (e.g. Profile ID, MSISDN or IMSI), and an identifier of the second embedded secure element 108.

In step 615, the first profile manager 103 finds the address of a profile provider 102 related to the first embedded secure element 107 through communication with the address search server 111. As described above, when the first profile manager 103 directly maintains such addresses, step 615 may be skipped.

In step 620, the first profile manager 103 forwards the received profile transfer request message to the profile provider 102.

Subsequently, steps 620 to 675 are identical or similar to steps 520 to 575 of FIG. 5, and hence a detailed description thereof is omitted.

Figure 7:
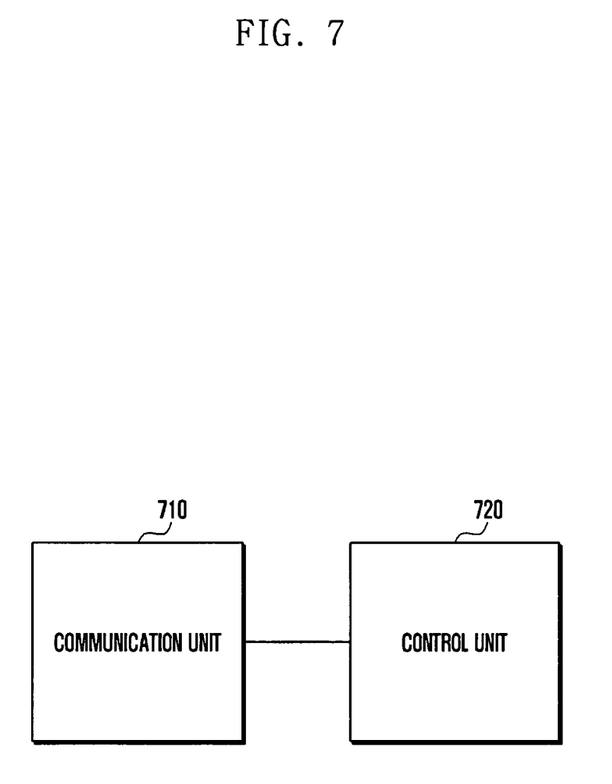
FIG. 7 is a block diagram of a profile provider according to an embodiment of the present invention.

FIG. 7 is a block diagram of a profile provider according to an embodiment of the present invention.

Referring to FIG. 7, the profile provider includes a communication unit 710 and a control unit 720.

The communication unit 710 sends and receives signals, which are required to realize at least part of the embodiments described in connection with FIGS. 1 to 6. For example, in FIG. 7, the communication unit 710 receives a profile transfer request message and sends a profile backup request message. The communication unit 710 sends an update request message for the K to the AuC and receives a corresponding result message. In addition, the communication unit 710 sends and receives encrypted profiles.

The control unit 720 performs processing required to realize at least part of the embodiments described in connection with FIGS. 1 to 6 and controls individual components of the profile provider accordingly. In particular, in FIG. 7, the control unit 720 decrypts an encrypted profile and encrypts a plaintext profile.

Figure 8:
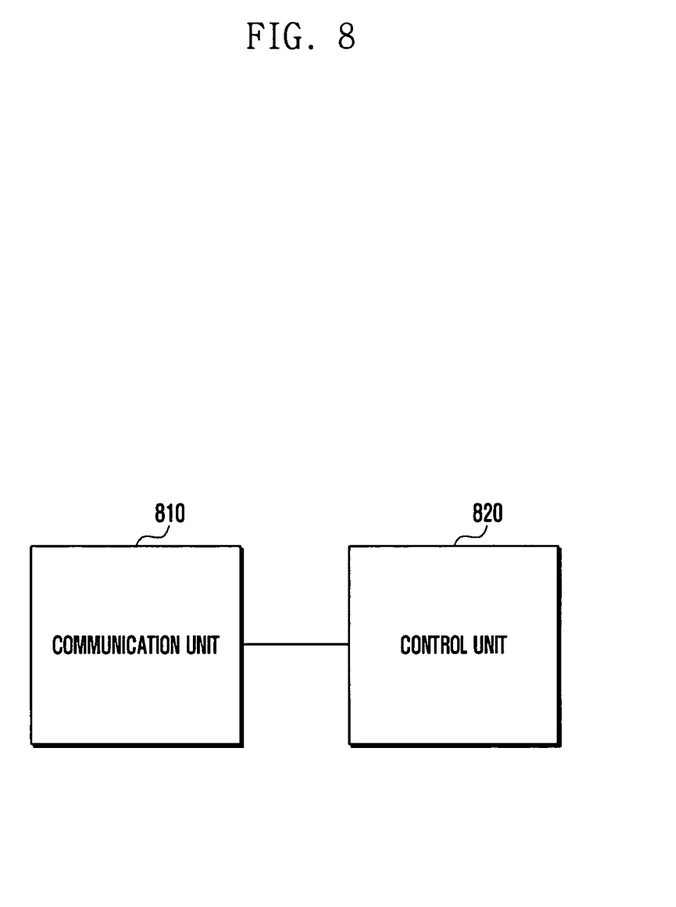
FIG. 8 is a block diagram of a profile manager according to an embodiment of the present invention.

FIG. 8 is a block diagram of a profile manager according to an embodiment of the present invention.

Referring to FIG. 8, the profile manager includes a communication unit 810 and a control unit 820.

The communication unit 810 sends and receives signals, which are required to realize at least part of the embodiments described in connection with FIGS. 1 to 6. For example, in FIG. 8 the communication unit 810 sends and receives a profile transfer request message and a profile backup request message. In addition, the communication unit 810 sends and receives encrypted profiles.

The control unit 820 performs processing required to realize at least part of the embodiments described in connection with FIGS. 1 to 6 and controls individual components of the profile manager accordingly.

Figure 9:
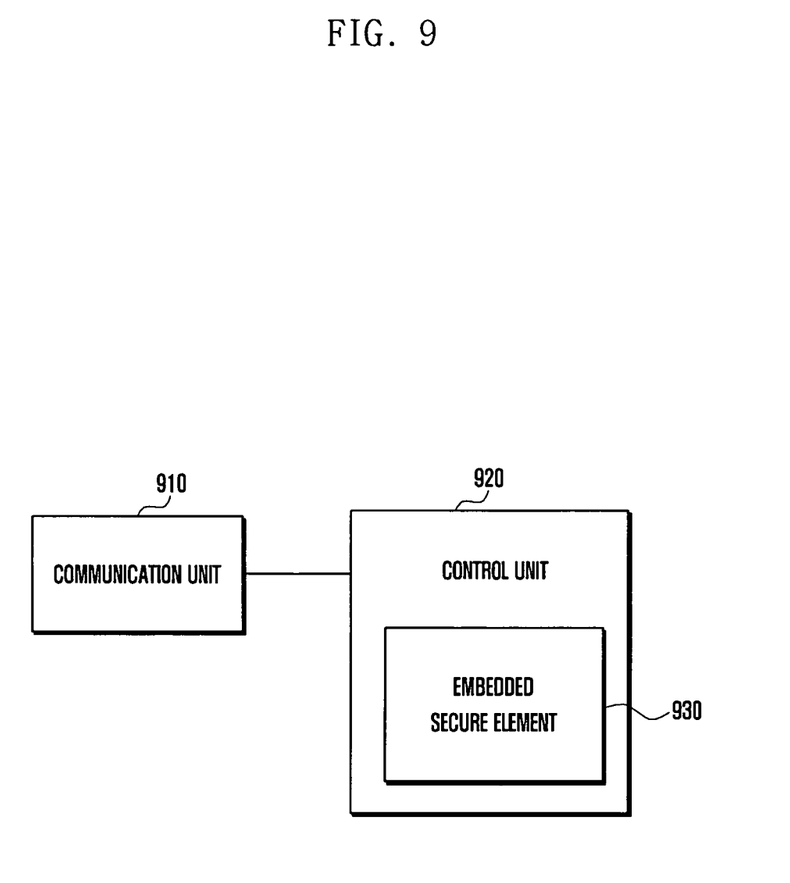
FIG. 9 is a block diagram of a mobile terminal according to an embodiment of the present invention.

FIG. 9 is a block diagram of a mobile terminal according to an embodiment of the present invention.

Referring to FIG. 9, the mobile terminal includes a communication unit 910 and a control unit 920. The control unit 920 includes an embedded secure element 930.

The communication unit 910 sends and receives signals, which are required to realize at least part of the embodiments described in connection with FIGS. 1 to 6. For example, in FIG. 9, the communication unit 910 sends and receives a profile transfer request message and a profile backup request message. In addition, the communication unit 910 sends and receives encrypted profiles.

The control unit 920 performs processing required to realize at least part of the embodiments described in connection with FIGS. 1 to 6 and controls individual components of the mobile terminal accordingly. In particular, in FIG. 9, the control unit 920 installs a profile in the embedded secure element 930 or uninstalls a profile therefrom. The control unit 920 encrypts or decrypts a profile. Among steps performed by the embedded secure element 930, some steps suitable for external processing may be performed by an entity external to the embedded secure element 930.

With regard to a removable UICC, when changing a terminal from a first terminal to a second terminal, the UICC is removed from the first terminal and be is inserted into the second terminal. In this case, as a physical card is transferred, the problem of card copying or duplication between two terminals does not arise.

In an environment where a software profile corresponding to one existing UICC is transferred between two embedded secure elements of different terminals, the problem of illegitimate copying or duplicated usage of a profile may arise. Additionally, in the event that a failure occurs while the profile of a first mobile terminal is copied to a second mobile terminal and is removed, both the first mobile terminal and the second mobile terminal may use the profile or neither may use the profile. This is an erroneous situation.

According to various embodiments of the present invention, when a user purchases a new mobile terminal or replaces an existing mobile terminal, the existing profile of the first mobile terminal can be safely transferred to the second mobile terminal. Moreover, after the profile is successfully transferred, only the second profile of the second mobile terminal is usable. When a failure occurs during profile transfer, the initial state is restored and only the first profile of the first mobile terminal is usable. Hence, characteristics of transaction processing (all or nothing) are achieved. In addition to applications provided initially by the MNO, applications added later to the profile (e.g. NFC banking/card application) and data added by the user (e.g. phonebook) may be transferred. In one embodiment of the present invention, unlike an existing removable UICC (which carries all stored data when removed from or inserted into a terminal), it is possible to back up and transfer all or a portion of the contents of a profile according to user or MNO selection.

The backed-up first profile is reconfigured by the profile providing server into a second profile through data addition or modification so that the second profile is installable in the second embedded secure element. When a profile is backed up, security information such as USIM key (K) is excluded from the backup target. Hence, the security risk is minimized even if the backed-up profile is leaked.

During profile reconfiguration, the first eSE ID is replaced with the second eSE ID so that the second profile is operable only in the second embedded secure element, preventing illegitimate profile copying. In addition, when the second profile is generated, the K managed by the AuC is changed. Hence, even when the first profile is not removed from the first embedded secure element, the first profile cannot be illegitimately used. Thereby, a security mechanism is provided.

In an embodiment of the present invention, security sensitive information (e.g. authentication key K of the USIM application) in the contents of a profile is not backed up, and the profile providing server adds corresponding data during profile reconfiguration, thereby minimizing the risk due to leakage. In the present invention, it is possible for the user or manager to designate applications and data to be backed up or transferred.

As described above, when a profile is successfully copied to the new embedded secure element, the profile is deleted from the old embedded secure element. It is necessary to cope with the possibility that two copies of the same profile are present in two mobile terminals due to one copy not being deleted because of an error or malicious intent. In an embodiment of the present invention, when a new profile is configured, the profile provider changes the USIM K and updates the AuC accordingly, preventing access to the communication network using the old profile.

As described above, it is necessary to prevent a profile from being copied to another embedded secure element without permission.

In an embodiment of the present invention, a profile is configured to include the identifier of the embedded secure element in which the profile is to be installed (eSE ID) and an associated digital signature, so that the profile is either not installable or is inoperable in a different embedded secure element. The digital signature prevents the eSE ID from being modified. The digital signature may be generated on the basis of a concatenation of important parameters in the profile (e.g. profile ID, eSE ID and IMSI) and a public key of the certificate of the profile providing server. Other similar schemes may be used to generate the digital signature. When the profile is transferred, the profile provider may change certain values and regenerate the digital signature.

It is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as a Field Programmable Gate Array (FPGA) or an Application Specific Integrated Circuit (ASIC) capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with other components and units to compose large components and units. Components and units may be configured to drive a device or one or more processors in a secure multimedia card.

The above description is provided to assist in a comprehensive understanding of various embodiments of the present invention. It includes various specific details to assist in that understanding but these are to be regarded as mere examples. Accordingly, those of ordinary skill in the art will recognize that various changes and modifications of the embodiments described herein can be made without departing from the scope and spirit of the present disclosure.

Embodiments of the present invention have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

What is claimed is:

1. A method for a profile server, the method comprising:
    receiving, from a first terminal, a first message that requests transfer of a portion or a whole of a first profile from a first module in the first terminal to a second module in a second terminal;
    generating a second profile using the portion or the whole of the first profile; and
    transmitting, to the second terminal, the generated second profile.

2. The method of claim 1, wherein receiving of the first message comprises:
    receiving, from the first terminal, the portion or the whole of the first profile.

3. The method of claim 1, further comprising:
    transmitting, to the first terminal, a second message requesting the portion or the whole of the first profile; and
    receiving, from the first terminal, the portion or the whole of the first profile.

4. The method of claim 1, further comprising:
    transmitting, if the second profile is successfully installed in the second module, a third message requesting update of authentication key information associated with the second profile to an authentication center (AuC).

5. The method of claim 4, further comprising:
transmitting, to the first terminal, a fourth message that requests a deletion of the first profile if the authentication key information is updated successfully.

6. A profile server, comprising:
a transceiver; and
a controller configured to:
control the transceiver to receive, from a first terminal, a first message that requests transfer of a portion or a whole of a first profile from a first module in the first terminal to a second module in a second terminal, and
generate a second profile using the portion or the whole of the first profile, and
control the transceiver to transmit to the second terminal, the generated second profile.

7. The profile server of claim 6, wherein the controller is further configured to control the transceiver to receive, from the first terminal, the portion or the whole of the first profile.

8. The profile server of claim 6, wherein the controller is further configured to control the transceiver to transmit, to the first terminal, a second message requesting the portion or the whole of the first profile, and receive, from the first terminal, the portion or the whole of the first profile.

9. The profile server of claim 6, wherein the controller is further configured to control the transceiver to transmit, if the second profile is successfully installed in the second module, a third message requesting update of authentication key information associated with the second profile to an authentication center (AuC).

10. The profile server of claim 9, wherein the controller is further configured to control the transceiver to transmit, to the first terminal, a forth message that requests a deletion of the first profile if the authentication key information is updated successfully.

* * * * *